G. P. BROOKS & J. McGRADY.
SHAVING CUP.

No. 66,788. Patented July 16, 1867.

Witnesses:
R. E. Teschemacher
N. W. Stearns

Inventor.
Geo. P. Brooks
Jas. McGrady

United States Patent Office.

GEORGE P. BROOKS AND JAMES McGRADY, OF BOSTON, MASSACHUSETTS.

Letters Patent No. 66,788, dated July 16, 1867.

---

IMPROVEMENT IN SHAVING-CUPS.

---

The Schedule referred to in these Letters Patent and making part of the same.

---

TO ALL WHOM IT MAY CONCERN:

Be it known that we, GEORGE P. BROOKS and JAMES McGRADY, of Boston, in the county of Suffolk, and State of Massachusetts, have invented an improved Shaving-Mug, of which the following is a full, clear, and exact description, reference being had to the accompanying drawings, making part of this specification, in which—

Figure 2:
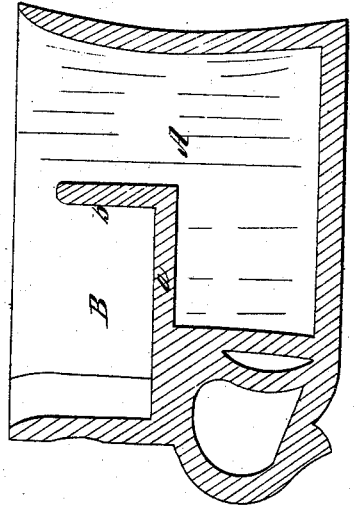
Figure 2 is a vertical section through the centre of the same.
Figure 1:
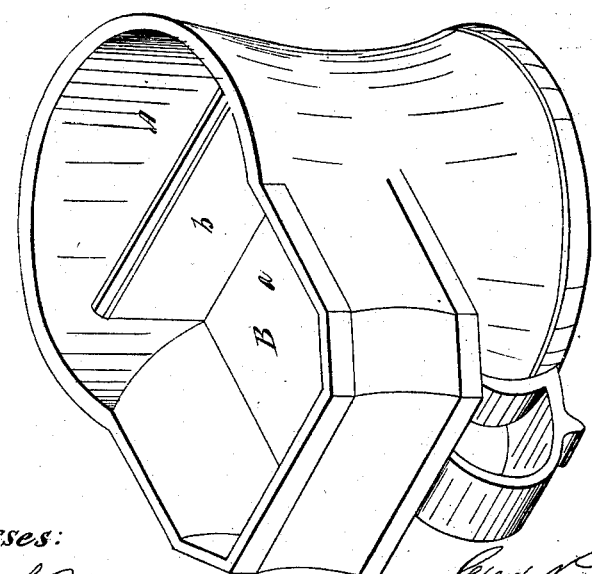
Figure 1 is a perspective view of our improved shaving-mug.

Our invention consists in combining a soap-receptacle with a mug, so that the soap may always be in a convenient position ready for use during the operation of shaving.

To enable others skilled in the art to understand and use our invention, we will proceed to describe the manner in which we have carried it out.

In the said drawings, A represents the portion of the mug which contains the water, the upper portion being enlarged at one side and provided with a bottom, $a$, and a partition, $b$, so as to form a receptacle, B, for holding the shaving-soap, which is thus always at hand with the mug, in a position ready for use. And it will be seen that hot water placed in the portion A of the mug, being partially covered over by the bottom of the receptacle B, will not become cooled so rapidly as would be the case if its entire surface were exposed to the air.

A shaving-mug formed as above described need occupy no more space than an ordinary mug, while it possesses the advantage of two receptacles, for water and soap, combined in one, it being merely necessary to dip the brush from one to the other to use the amount of soap or water required.

The above-described mug may be constructed of earthenware, metal, or other suitable material, and the water may be heated in it, instead of in a separate vessel, if desired.

*Claim.*

What we claim as our invention, and desire to secure by Letters Patent, is—

The within-described shaving-mug A, with its soap-receptacle B, substantially as described.

GEO. P. BROOKS,
JAS. McGRADY.

Witnesses:
P. E. TESCHEMACHER,
W. J. CAMBRIDGE.